(12) United States Patent
Izumo et al.

(10) Patent No.: US 8,203,086 B2
(45) Date of Patent: Jun. 19, 2012

(54) DETACHABLE WINDSHIELD FOR WEIGHING APPARATUS WITH A T-SHAPED LATCHING MECHANISM AND A FLOOR-MEMBER ABUTTING PORTION FOR PROVIDING DIRECT ATTACHMENT OF THE WINDSHIELD TO THE WEIGHING APPARATUS HOUSING

(75) Inventors: Naoto Izumo, Kitamoto (JP); Hirosi Sigano, Kitamoto (JP); Satosi Suzaki, Kitamoto (JP)

(73) Assignee: A&D Company, Ltd., Tokyo (JP)

( * ) Notice: Subject to any disclaimer, the term of this patent is extended or adjusted under 35 U.S.C. 154(b) by 285 days.

(21) Appl. No.: 12/449,936

(22) PCT Filed: Feb. 4, 2008

(86) PCT No.: PCT/JP2008/051769
§ 371 (c)(1),
(2), (4) Date: Sep. 22, 2009

(87) PCT Pub. No.: WO2008/108130
PCT Pub. Date: Sep. 12, 2008

(65) Prior Publication Data
US 2010/0000802 A1    Jan. 7, 2010

(30) Foreign Application Priority Data
Mar. 5, 2007 (JP) .................... 2007-054137

(51) Int. Cl.
G01G 21/28 (2006.01)
H05K 7/14 (2006.01)
(52) U.S. Cl. ........ 177/180; 49/465; 312/265.1; 361/725; 361/726
(58) Field of Classification Search ................ 177/180, 177/181, 238; 49/465; 361/725–727; 312/265.1
See application file for complete search history.

(56) References Cited

U.S. PATENT DOCUMENTS

| 4,798,250 | A  |   | 1/1989  | Knothe et al. |         |
|-----------|----|---|---------|---------------|---------|
| 5,345,043 | A  | * | 9/1994  | Luechinger et al. | 177/180 |
| 5,583,322 | A  |   | 12/1996 | Leisinger et al. |       |
| 6,566,614 | B1 | * | 5/2003  | Fluckiger et al. | 177/180 |
| 6,686,545 | B2 | * | 2/2004  | Luchinger et al. | 177/180 |
| 6,909,057 | B2 | * | 6/2005  | Aebi et al.   | 177/180 |
| 7,960,658 | B2 | * | 6/2011  | Mock          | 177/126 |
| 2010/0326743 | A1 | * | 12/2010 | Durst et al. | 177/180 |

FOREIGN PATENT DOCUMENTS

| JP | 6-62330      | 9/1994 |
| JP | 8-136333     | 5/1996 |
| JP | 10-253435    | 9/1998 |
| JP | 2000-131132  | 5/2000 |
| JP | 2003-130721  | 5/2003 |

* cited by examiner

*Primary Examiner* — Randy W Gibson
(74) *Attorney, Agent, or Firm* — Jordan and Hamburg LLP

(57) ABSTRACT

A windshield for attaching and detaching to an electronic scale includes a plurality of mechanism for the attaching and detaching. Each of the mechanisms includes a latch which engages a member generally found on conventional electronic seals.

7 Claims, 7 Drawing Sheets

DETACHABLE WINDSHIELD FOR WEIGHING APPARATUS WITH A T-SHAPED LATCHING MECHANISM AND A FLOOR-MEMBER ABUTTING PORTION FOR PROVIDING DIRECT ATTACHMENT OF THE WINDSHIELD TO THE WEIGHING APPARATUS HOUSING

BACKGROUND OF INVENTION

The present invention relates to a windshield for a weighing apparatus such as an electronic scale, and particularly to a detachable windshield that can securely be attached to a weighing apparatus and appropriately be attached and detached depending on the intended use by a weighing apparatus user.

In a weighing apparatus, so-called electronic scales including an electromagnetic balancing type weighing apparatus that is called an electronic balance and a high-precision load cell type scale can measure a micro mass, while the electronic scales are largely affected by disturbance. One of the disturbances is airflow around a pan on which a measurement target is placed.

For example, airflow from an air conditioner, human breath during the measurement, and airflow generated by human walk act as a wind pressure on a weight-bearing portion centered on the pan, and the pan is affected by a so-called blast of the wind pressure, which results in an unstable measurement value and a measurement error. Therefore, a windshield that covers the weight-bearing portion centered on the pan is used not only in a high-precision electronic scale called an analytical balance having a minimum scale of about 0.1 mg but also in a model commonly called a general-purpose balance whose minimum scale ranges from about 0.01 g to about 0.001 g.

For the analytical balance, because the windshield is an element necessary to accurately measure a weight, the windshield is formed as part of the electronic scale, that is, the windshield is integral with the electronic scale main body. On the other hand, for the general-purpose balance, frequently the detachable windshield that is formed independently of the electronic scale main body is used in the electronic scale if needed.

In the analytical balance, the windshield integral with the electronic scale main body has an opening and closing portion (hereinafter referred to as "door") in right and left portions or an upper portion of the windshield, and good usability is achieved. However, the windshield portion becomes inevitably complicated because a frame and a door sliding portion are formed to ensure the opening and closing of the door. Frequently the detachable windshield has a structure simpler than that of the integrated windshield because of demand for light weight and low cost, and frequently the detachable windshield is inferior in usability to the integrated windshield.

In the future, it is believed that the high-precision measurement is increasingly demanded not only in the analytical balance but also in the general-purpose balance, and it is predicted that the distinction between the analytical balance and the general-purpose balance becomes difficult or meaningless as performance of the electronic scale is enhanced in the field of the general-purpose balance. Thus, a need for the windshield is increasingly grown as a whole in the electronic scale.

For example, some proposals of the detachable windshield for the electronic scale, including above-described view point, have been made as follows:

Patent Document 1: Japanese Patent No. 3501857
Patent Document 2: Japanese Patent Application Laid-Open No. 2003-130721
Patent Document 3: Japanese Patent Application Laid-Open No. 10-253435
Patent Document 4: U.S. Pat. No. 4,798,250
Patent Document 5: Japanese Patent No. 3445538

SUMMARY OF THE INVENTION

Regardless of whether the detachable type or the integrated type, from the viewpoint of user-friendliness of the windshield, desirably a windshield side portion or a windshield top portion can be opened in order to open the inside of the windshield, and a predetermined portion is appropriately opened to take out and put in the sample or to measure the sample according to a size of the sample or a kind (such as liquid and powder) of the sample. For example, when the liquid sample is dropped on the pan with a dropper, the opening in the upper portion of the windshield makes work extremely easy. A large-size windshield having a large capacity of the windshield itself is desirable in consideration of taking and putting the sample out of and in the windshield and of the measurement of a large-size sample such as a long sample.

In a technique described in Patent Document 1, a substantially cubic detachable windshield is placed on an upper surface of the electronic scale about the pan, and the sample is taken out of and put in the windshield by opening and closing the top of the windshield. A technique described in Patent Document 2 has the same object and configuration as those of Patent Document 1.

In techniques described in Patent Documents 3 and 4, a windshield formed into a substantially cylindrical shape is divided into two in a cylindrical shaft center direction such that one of the semi-cylinders can be accommodated in the other semi-cylinder, thereby appropriately turning both the semi-cylinders to open and close the windshield.

In the detachable windshield disclosed in Patent Documents 1 to 4, the compact windshield is formed with the small capacity compared with the configuration of the integrated windshield of the weighing apparatus such as the electronic scale. The compact windshield having the small capacity means countercurrent from the viewpoints of user-friendliness and convenience. The windshield opening and closing portion is provided only in the top portion, or the windshield opening and closing portion is the semi-cylindrical opening portion. Thus, the detachable windshields disclosed in Patent Documents 1 to 4 are inferior in the user-friendliness to the integrated windshield in which the upper and lower and right and left portions of the windshield can appropriately be opened.

The problem with techniques disclosed in Patent Documents 1 to 4 is attributed to the following reasons.

The detachable windshields disclosed in Patent Documents 1 to 4 are simply placed on the weighing apparatus such as the electronic scale, and are not in a special engagement state with the electronic scale side. A lower end portion of the windshield is fitted in a recess formed in a surface of the electronic scale or a projection of one of the windshield and the weighing apparatus is engaged with the recess of the other at most. Accordingly, when the windshield is enlarged to obtain the user-friendliness, or when the opening and closing portions are provided in the upper, right, and left portions of the windshield, possibly the position of the windshield is gradually shifted by the manipulation of the opening and closing portions, or worse, over-turning of the windshield may occur. Although usually the over-turning of the windshield does not occur, for example, it is predicted in no small part that a hand of an electronic scale user or some sort of tool hits at the windshield to cause the over-turning.

Because the electronic scale main body portion below the windshield is heavy in the integrated windshield, a gravity center is lowered in the whole electronic scale, and the over-turning of the electronic scale hardly occurs even if the human hand or some sort of tool hits at the electronic scale. In such cases, undesirably a weighing mechanism portion that is central to the function of the electronic scale having the integrated windshield is subject to a relatively large shock. However, that the over-turning of the windshield itself does not occur is safer than the situation in which the over-turning of the windshield occurs to break other machine, the situation in which the windshield hits at a chemical container to scatter chemical, or the situation in which the over-turning of the windshield occurs to break the windshield itself.

From this viewpoint, even in the detachable windshield, desirably the detachable windshield is securely fixed to the electronic scale in attaching the windshield to the electronic scale. However, in order to securely fix the detachable windshield to the electronic scale, it is necessary that a mechanism engaged with the windshield be separately formed not only on the windshield side but also on the electronic scale side. Even if the engagement mechanism is provided on the electronic scale side, a large advantage that the necessity of the windshield is appropriately determined according to the intended use is lost in the detachable windshield when the engagement mechanism becomes complicated or when the engagement mechanism is difficult to manipulate.

In the techniques described in Patent Documents 1 to 4, although the advantage of the large-sized windshield is recognized, the downsizing of the detachable windshield is achieved at the expense of, to some extent, the user-friendliness and versatility to handle samples of various sizes in order to prevent the over-turning and displacement. Patent Documents 1 and 3 are applied by the present inventors, and the windshield is configured in consideration of the technique at that time. In the configurations disclosed in Patent Documents 3 and 4, the windshield is made of thick glass to dare to increase the weight of the windshield, and the over-turning of the windshield is prevented by the large self weight.

On the other hand, in the technique described in Patent Document 5, the problem with the techniques described in Patent Documents 1 to 4 is solved to a respectable degree. That is, in the technique described in Patent Document 5, a sliding type engagement member called a latch slide is provided on the windshield side, and an engagement member such as a collar-head bolt that is engaged with the latch slide is separately projected on the electronic scale main body side. In attaching the windshield, a latch slide opening that is larger than a width of a collar of the collar-head bolt is aligned with the collar-head bolt, and the latch slide is slid to engage the collar-head bolt and a latch slide opening that is smaller than the width of the collar of the collar-head bolt, thereby fixing the windshield to the electronic scale main body.

When the engagement means is provided, because the windshield and the electronic scale main body are relatively strongly coupled to each other, the detachable windshield can be enlarged. Actually, in the technique of Patent Document 5, the detachable windshield is proposed as the large-sized detachable windshield having an upper door and right and left doors.

However, because the windshield and the electronic scale main body are engaged by the collar-head bolt, the shock is concentrated only on the collar-head bolt when the hand or object hits at the windshield, and there is a risk of severe damage in the collar-head bolt or the engagement portion between the collar-head bolt and the latch slide. Further, because a stopper mechanism that accurately stops the latch slide in a predetermined position is eliminated in the latch slide, possibly the collar-head bolt and the latch slide are not engaged when the latch slide is stopped while the latch slide moving position is deviated.

Further, obviously part of the bolt, particularly in the collar portion, is projected from an upper case of the electronic scale to the top because the collar-head bolt is engaged with the latch slide. In the configuration, possibly a problem is generated when the electronic scale is used while the windshield is detached. In the pan type weighing apparatus including the electronic scale, desirably the periphery of the pan is formed as flat as possible, and the unnecessary projection for the scaling work is prevented from existing on the top of the case. The object or a sleeve of the white coat is hooked in the projection to obstruct the measuring work, and the projection obstructs the cleaning of the periphery of the pan.

Sometimes the above-described point becomes troublesome in an environment in which the windshield is used. When the electronic scale is used as a dedicated machine in various production lines, because of the necessity of a combination with an automated machine, sometimes the work is performed while the dedicated windshield is detached to form a fence (large-size windshield) in the entirety including the automated machine. In such cases, the similar problem with the projection is generated in the electronic scale because the dedicated windshield is detached from the electronic scale.

The position in front of the windshield corresponds to a display portion (manipulation portion of a numeric keypad and the like) in front of the electronic scale, and right and left door sliding grooves are formed in the windshield side portions. Therefore, the latch slide sliding direction becomes the front-back direction of the windshield, and a sliding manipulation end is restricted to a rear end of the windshield as illustrated in FIG. 3 of Patent Document 5. Accordingly, from the necessity of latch slide manipulation, the rear portion of the electronic scale to which the windshield is attached cannot be disposed close to a wall surface. Desirably the position in which the electronic scale is disposed is freely selected because usually other machines and tools are disposed in the environment in which the electronic scale is disposed.

The invention solved the problem that had not been solved by the techniques disclosed in Patent Documents. The invention is characterized in that a detachable windshield has a capacity equal to or more than that of the integrated windshield and a windshield opening and closing function, a placement position can freely be selected, and the detachable windshield can be attached and detached to and from the weighing apparatus by an extremely simple manipulation.

In the invention, opening portions are formed in an upper portion of the windshield main body and in right and left portions of the windshield main body, and the detachable windshield is formed as a large-size windshield in which the windshield capacity is equal to or more than that of the integrated windshield. Plural attaching and detaching mechanisms are provided at plural points in a bottom portion of the windshield to attach and detach the windshield main body to and from the weighing apparatus that is an attaching target. Each of the attaching and detaching mechanisms includes an engagement member, a moving member that causes the engagement member to proceed and recede, i.e., project and retract with respect to the inside of the windshield, and fixing means for fixing the moving member at a predetermined position. The detachable windshield of the invention is characterized in that the engagement member and, for example, an end portion of an existing floor plate (dust plate) that is the pan placement surface of the electronic scale are engaged and disengaged by the procession and recession of the engagement member, thereby attaching and detaching the windshield to and from the weighing apparatus by just a single touch of the moving means.

In the windshield of the invention, the existing member provided on the electronic scale main body side is used as the means for engaging the windshield, so that the detachable windshield can be attached to the electronic scale without basically remodeling the electronic scale main body or without attaching a new component to the electronic scale main body. Therefore, the windshield of the invention can be attached to wide variety of electronic scales.

In the engagement with the electronic scale, because the windshield is engaged with and fixed to the electronic scale in at least two points, the electronic scale and the windshield are extremely strongly engaged with each other. As a result, even though it is the detachable windshield, the detachable windshield has the large capacity that is equal to or more than that of the integrated windshield and many opening and closing portions. Due to no virtual risk of over-turning or displacement of the windshield, the detachable windshield can be used as the safe windshield having user-friendliness equal to or better than that of the integrated windshield, even though it is the detachable windshield.

BRIEF DESCRIPTION OF THE DRAWINGS

FIG. 2 illustrates a moving member and a latch member, constituting part of an attaching and detaching mechanism.

FIG. 8 illustrates a state in which the moving member is placed in a guide groove portion of FIG. 7.

DETAILED DESCRIPTION OF THE INVENTION

Each portion constituting the detachable windshield is made of a synthetic resin such that the entire windshield is formed lightweight even if the large-size detachable windshield is formed. Basically the electronic scale to which the windshield is attached is not remodeled, but a latch member of an attaching and detaching mechanism provided in the detachable windshield is latched in a pan floor member.

First Embodiment

An embodiment of invention will be described below with reference to the drawings.

Figure 1:
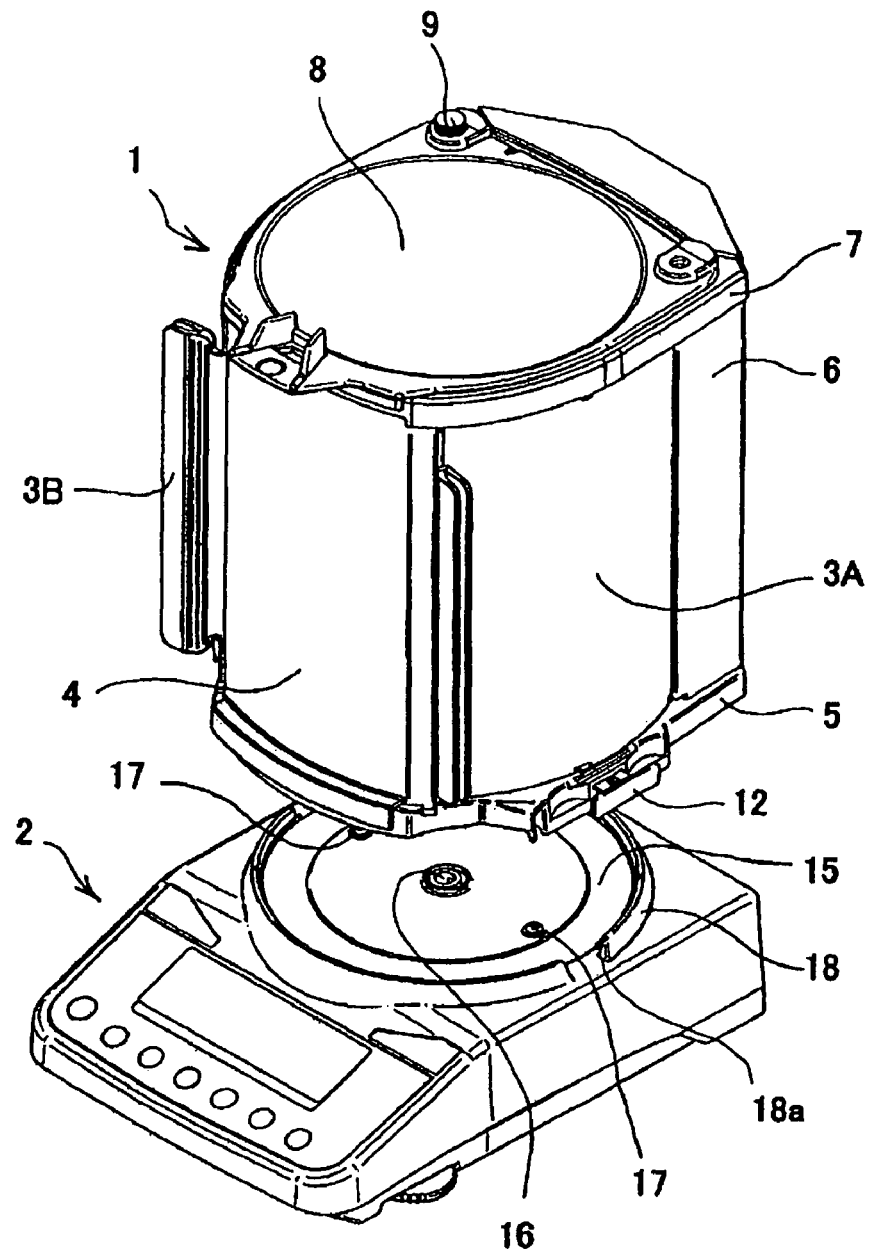
FIG. 1 is a perspective view illustrating a detachable windshield according to an embodiment of the invention and an electronic scale.

FIG. 1 illustrates a detachable windshield main body 1 according to an embodiment of invention and an electronic scale 2 that is the weighing apparatus to which the detachable windshield 1 is attached. Hereinafter the detachable windshield main body 1 is simply referred to as windshield 1 unless otherwise noted.

First a configuration of the windshield 1 will be described. In the windshield 1 of FIG. 1, the numerals 3A and 3B designate right and left slide doors constituting part of the windshield 1. The windshield 1 is formed into a substantially cylindrical shape, and the slide doors 3A and 3B are formed so as to constituter part of a cylindrical sidewall of the windshield 1, whereby the slide doors 3A and 3B are formed so as to be opened and closed along a circumference that is cylindrical projection geometry. Accordingly, the slide doors 3A and 3B are not projected from a rear portion of the windshield even if the slide doors 3A and 3B are opened. The numeral 5 designates a lower frame member constituting part of the windshield main body 1, the numeral 7 designates an upper frame member, and the numeral 6 designates a rear frame member that couples the upper and lower frame members 7 and 5. The right and left slide doors 3A and 3B are opened and closed along guide grooves formed in the upper and lower frame members 7 and 5.

The numeral 4 designates a front fixed panel. Upper and lower end portions of the front fixed panel 4 are fitted in the upper and lower frame members 7 and 5, respectively, thereby fixing the front fixed panel 4 at a front position in the center of the windshield main body 1 as illustrated in FIG. 1. The numeral 8 designates an upper door. The upper door 8 is turned about a screw 9 attached to the upper frame member 7, thereby opening and closing an upper space.

The windshield main body 1 having the substantially cylindrical shape includes the upper and lower frame members 7 and 5, the rear frame member 6, the right and left slide doors 3A and 3B and fixed panel 4 that are sandwiched between or supported by the frame members 5, 6, and 7, and the upper door 8 that is provided in the upper frame member 7.

There is no particular limitation to material of each component. However, for example, when the upper, lower, and rear frame members 7, 5, and 6 are made of an aluminum die-cast product and the right and left slide doors and upper doors 3A, 3B, and 8 are made of glass, the total weight of the windshield main body 1 becomes significantly heavy and production cost increases. In view of these points, each component is made of a synthetic resin, and the right and left slide doors and upper door 3A, 3B, and 8 are made of a transparent acrylic resin. As a result, the weight reduction can be achieved in the whole of the windshield main body 1 and the production cost can also be suppressed to a lower level.

A configuration of the attaching and detaching mechanism that attaches and detaches the windshield main body 1 to and from the electronic scale 2 will be described.

A basic function of latch means will schematically be described, and then a mechanism for achieving the function will specifically be described.

A latch member is provided in a bottom portion of the windshield main body. The latch member goes into the pan floor member previously provided in the electronic scale when the windshield main body is placed on the electronic scale. The latch member is caused to proceed and recede by means for causing the latch member to proceed and recede, and the windshield main body is engaged with and disengaged from the electronic scale, thereby attaching and detaching the windshield.

The configuration of the attaching and detaching mechanism will specifically be described.

The attaching and detaching mechanism includes the latch member, a moving member, and a guide groove. The latch member is directly engaged with the pan floor member of the electronic scale. The latch member is attached to the moving member, and the moving member performs the proceeding and receding operations with respect to the latch member. The guide groove is formed in the lower frame member 5 constituting part of the windshield main body, and guides the proceeding and receding operations of the moving member.

Figure 2A:
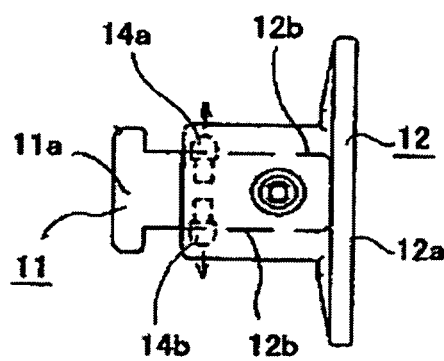
FIG. 2(A) is a plan view of the moving member.
Figure 2B:
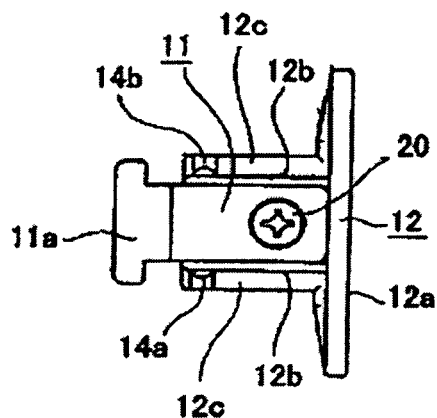
FIG. 2(B) is a bottom view of the moving member.
Figure 4A:
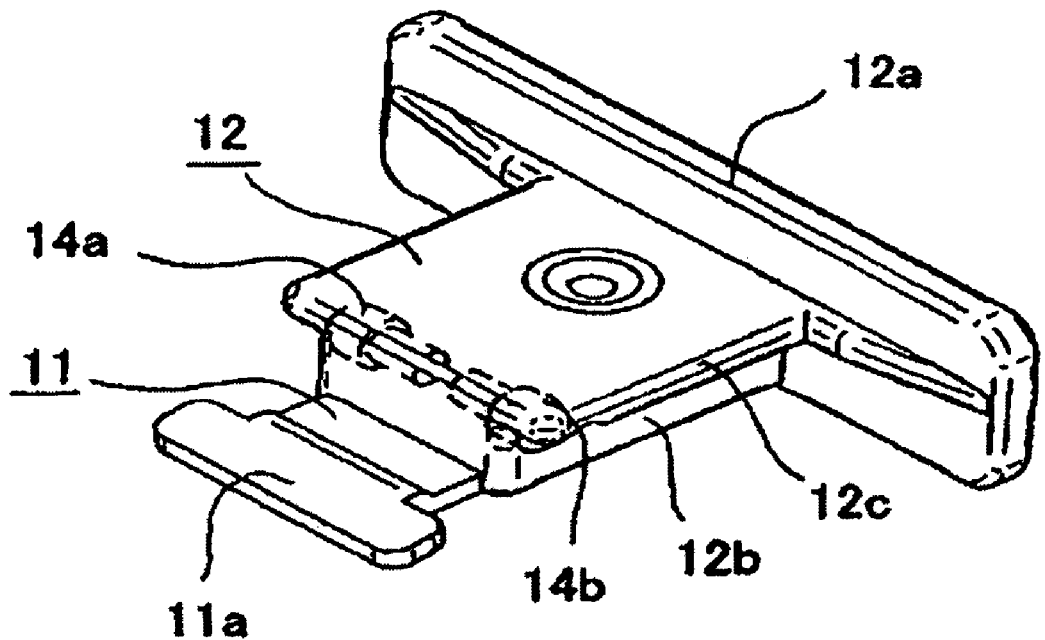
FIG. 4(A) is a perspective view of the moving member.
Figure 4B:
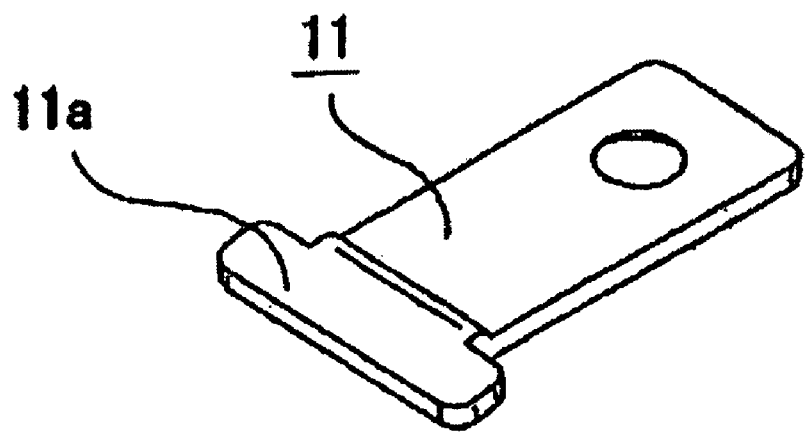
FIG. 4(B) is a perspective view of the latch member attached to the moving member.

In FIGS. 2(A), 2(B), and 4(A), the numeral 11 designates the latch member made of a material such as a metal plate having high strength. The numeral 12 designates the moving member, and the latch member 11 is fixed to the moving member 12 by fixing means such as a screw 20. In the latch member 11, a floor-member abutting portion 11a that is directly engaged with the pan floor member on the electronic scale side is projected from a leading end portion of the moving member 12 by fixing the latch member 11 to the moving member 12. In the moving member 12, an end portion facing the end portion from which the floor-member abutting portion 11a is projected constitutes a knob 12a used to draw and push in the moving member 12.

The numerals 14a and 14b designate latch pins. The latch pins 14a and 14b are disposed so as to be orthogonal to a sidewall 12b of the moving member 12, and the latch pins 14a and 14b are biased so as to be projected toward the outside of the sidewall 12b of the moving member 12 as illustrated by arrows of FIG. 2(A) by an elastic member such as a coil spring (not illustrated) interposed therebetween.

Figure 5:
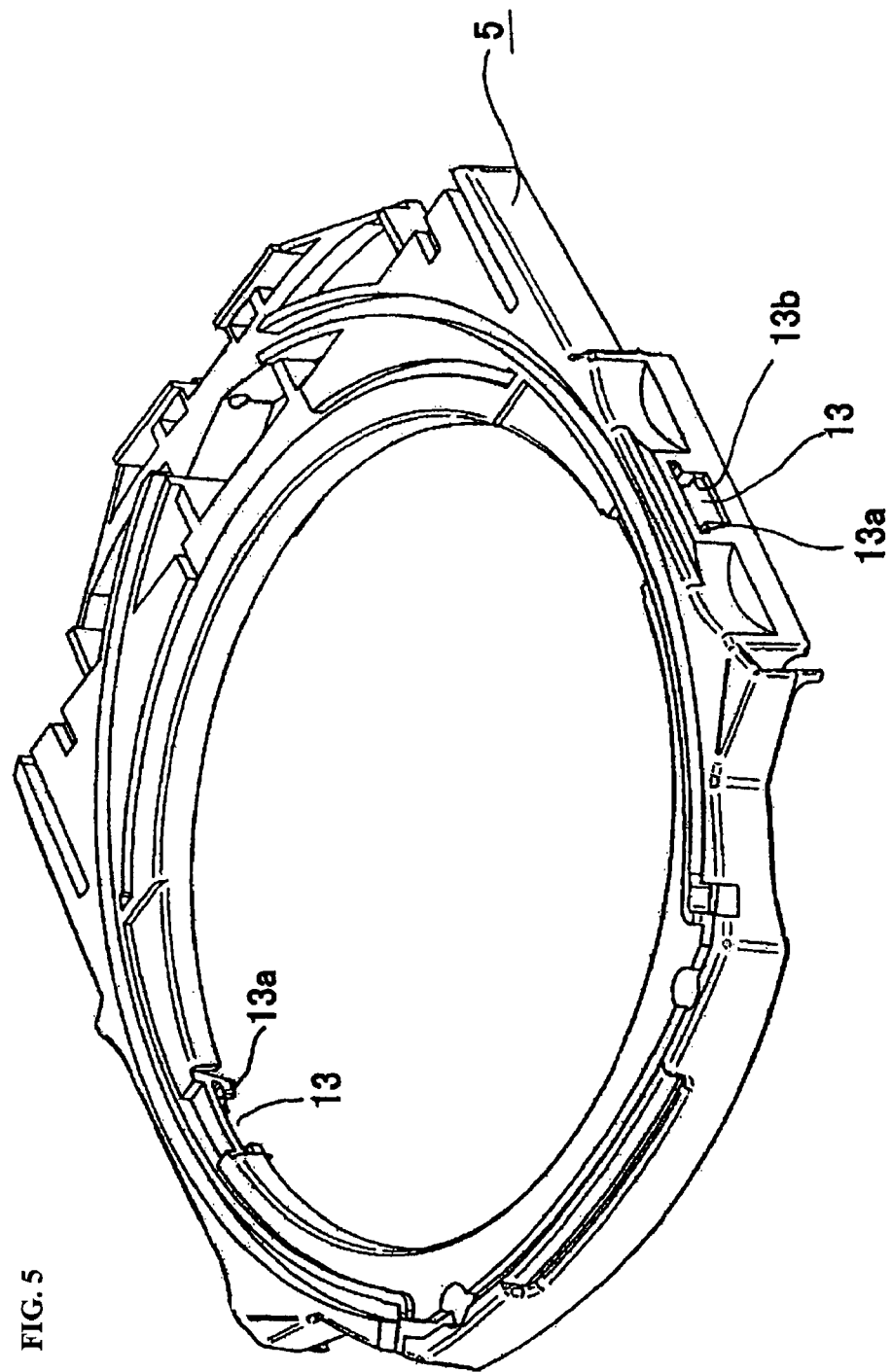
FIG. 5 is a perspective view illustrating a lower frame member constituting part of the windshield.
Figure 6:
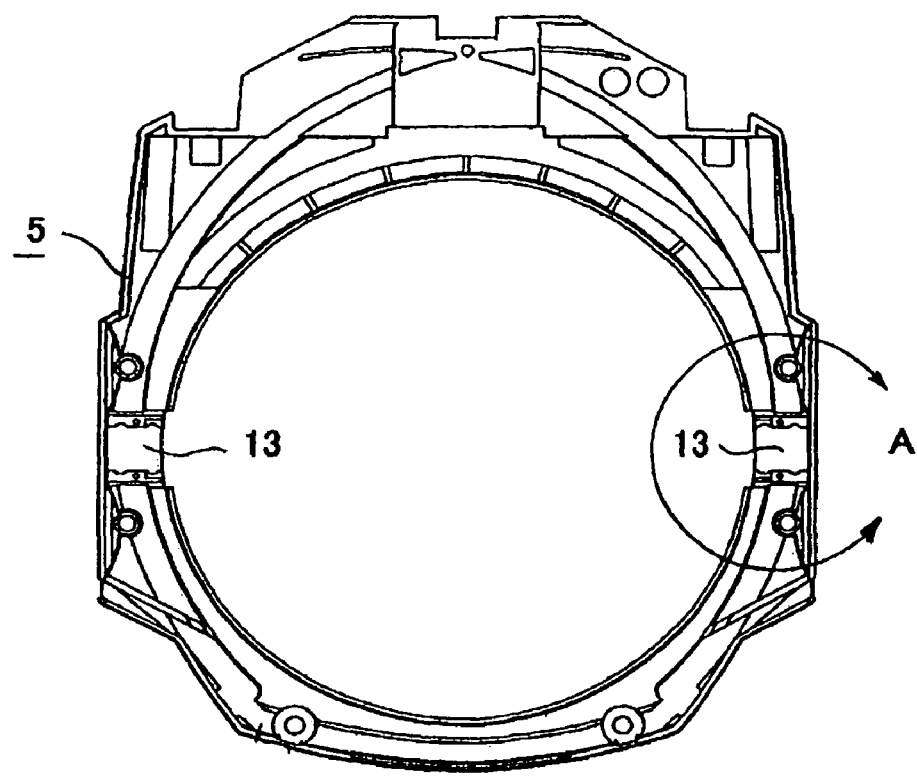
FIG. 6 illustrates a bottom surface of the lower frame member.

A configuration of the guide groove that guides the proceeding and receding operations of the moving member 12 provided in the lower frame member 5 will be described with reference to FIGS. 5 to 7. The numeral 13 designates the guide groove. As illustrated in FIGS. 5 and 6, the guide grooves 13 are formed at two points so as to substantially face each other in a circumferential wall portion of the lower frame member 5. The front shape of the guide groove 13 is formed into a substantial T-shape (see FIG. 5). A hood portion 12c extended toward the outside of the sidewall portion 12b above the sidewall portion 12b of the moving member 12 is fitted and inserted in an upper horizontal portion 13a, and the sidewall portion 12b of the moving member 12 is located in a vertical portion 13b below the horizontal portion 13a. Therefore, the moving member 12 can smoothly be drawn and pushed along the guide groove 13 without dropping out from the guide groove 13.

Figure 7:
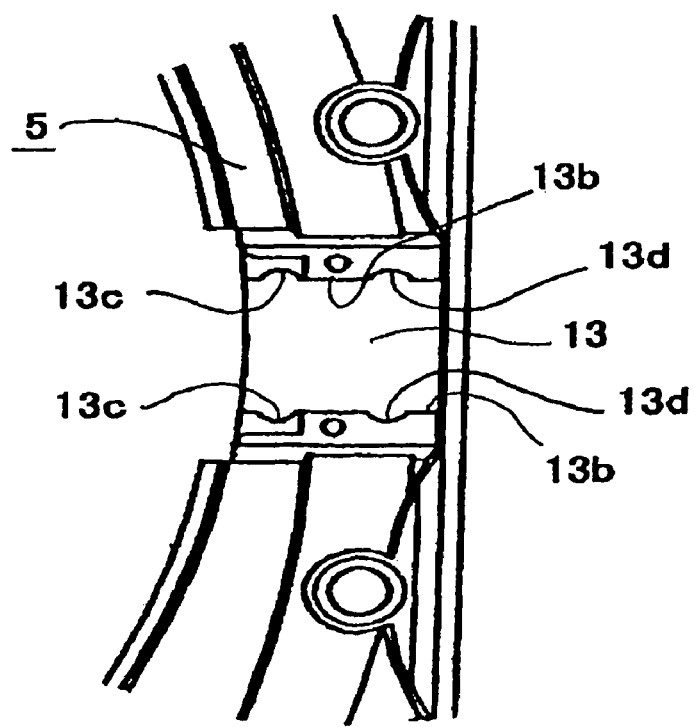
FIG. 7 is an enlarged view illustrating an A portion of FIG. 6.

Engagement recesses 13c and 13d are formed in a depth direction of the guide groove 13 in the vertical portions 13b on both sides of the guide groove 13 (see FIG. 7). As described below, when the moving member 12 is drawn and pushed along the guide groove 13, each of the latch pins 14a and 14b located on the side of the moving member 12 is engaged with one of the engagement recesses 13c and 13d to stop and fix the moving member 12 in the guide groove 13 at a predetermined position.

Then the pan floor member of the electronic scale 2 that is the target directly engaged with the detachable windshield 1 will be described with reference to FIG. 1. In FIG. 1, the numeral 15 designates the pan floor member. The pan floor member 15 itself is a conventional component attached to the electronic scale, and is fixed to a pan placement surface around the pan connecting portion 16 by a screw 17. The pan floor member 15 is usually made of stainless steel or a chrome plated steel material. A chassis constituting the electronic scale 2 is made of an aluminum die-cast product or a synthetic resin molding product. When the pan is directly placed on the chassis, a sample fallen on a surface of the chassis is hardly removed, or sometimes the chassis is melted depending on the type of the sample in cases where the chassis is made of the synthetic resin. Therefore, the pan floor member 15 is provided.

The numeral 18 is a dam portion that is projected on the chassis side of the electronic scale 2 so as to surround the pan floor member 15. The dam portion 18 prevents the dust from invading into the backside of the pan floor member 15, and prevents the airflow from invading into the lower surface of the pan floor member 15 even in cases where the electronic scale 2 is used without the windshield like the conventional general-purpose balance. In the dam portion 18, a notch 18a is provided in a portion in which the attaching and detaching mechanism of the windshield 1 is located in order to ensure the operation of the moving member 12 of the attaching and detaching mechanism. When the sample or dust falls on the pan floor member 15, the notch 18a can also be used as an opening through which the fallen sample or dust is wiped out (swept out). Particularly, in the food industry, a trouble with mixing of a foreign material or dust in a product is serious as a so-called "contamination issue", and usually facilities related to production are daily cleaned every few hours. Therefore, for the electronic scale placed on a food production line, the cleaning is easy to perform because of the opening, and user-friendliness is improved in an environment in which the cleaning is required.

Even if the powder or liquid sample falls on the pan floor member 15, the placement of the pan floor member 15 improves resistance characteristics against the sample, and the sample is easy to wipe because the surface of the pan floor member 15 is smoothly formed like mirror finishing. Because the pan floor member 15 is made of a metal plate, the pan floor member 15 originally has a high physical strength. In the embodiment of invention, the windshield is latched in the pan floor member to fix the windshield to the electronic scale.

FIG. 8 specifically illustrates an engagement state between the guide groove 13 and the moving member 12 when the windshield 1 is attached to and detached from the electronic scale 2. FIG. 3 conceptually illustrates an engagement state between the latch member 11 of the moving member 12 of FIG. 8 and the pan floor member 15 on the side of the electronic scale 2. The engagement state between the detachable windshield 1 and the electronic scale 2 will be described with reference to FIGS. 3 and 8.

Figure 3A:
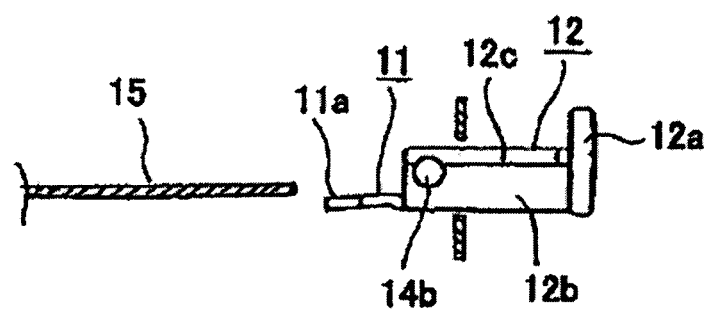
FIG. 3 is a conceptual view illustrating a state in which the moving member and engagement member are engaged with a pan floor member.
Figure 8A:
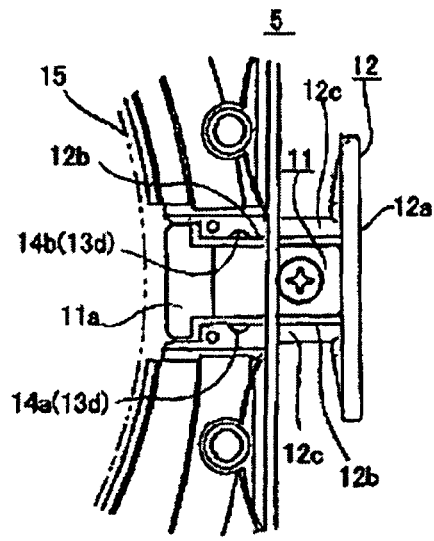
FIG. 8(A) illustrates a state in which the moving member is drawn.

FIGS. 8(A) and 3(A) illustrate the state in which the moving member 12 is fixed in the position where the windshield 1 is drawn to the outside by respectively engaging the latch pins 14a and 14b of the moving member 12 with the engagement recesses 13c and 13c provided in the facing vertical walls 13b of the guide groove 13. In the state of FIGS. 8(A) and 3(A), the floor-member abutting portion 11a of the latch member 11 is pulled in on the side of the guide groove 13, and the floor-member abutting portion 11a is not engaged with the pan floor member 15 on the side of the electronic scale 2. Therefore, the windshield main body 1 can be detached from the electronic scale 2.

The floor-member abutting portion 11a at the leading end of the latch member 11 is formed wider than the main body portion of the latch member 11, and the whole of the latch member 11 has the substantially T-shape in plane. Therefore, the moving member 12 does not drop out from the windshield 1, because the floor-member abutting portion 11a is latched in the end edge of the guide groove 13 even if the moving member 12 is moved in the drawing direction.

At this point, the windshield main body 1 is placed on the electronic scale 2. The notch 18a formed in the dam portion 18 becomes an effective marker when the windshield main body 1 is placed in a predetermined position of the electronic scale 2.

Figure 3B:
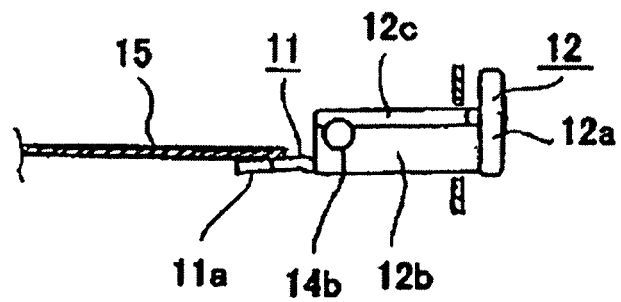
Figure 8B:
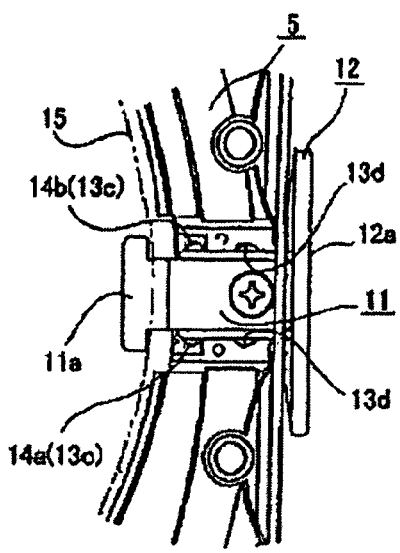
FIG. 8(B) illustrates a state in which the moving member is pushed in the guide groove portion.

When the knob 12a of the moving member 12 is pushed while the windshield 1 is placed in a predetermined position of the electronic scale 2, the moving member 12 is moved from the state of FIGS. 8(A) and 3(A) to the state of FIGS. 8(B) and 3(B), the latch pins 14a and 14b are located in the engagement recesses 13c and 13c, and the moving member 12 is fixed in a position while the latch member 11 is projected to the inside of the lower frame member 5. Therefore, the floor-member abutting portion 11a of the latch member 11 is closely engaged with the backside of the pan floor member 15, thereby strongly fixing the windshield 1 to the electronic scale 2. Because the latch member 11 of the moving member 12 and the pan floor member 15 are made of a metal material, the latch member 11 and the pan floor member 15 have the sufficiently high physical strength. From the viewpoint of strength, the electronic scale 2 to which the windshield 1 is attached can easily be lifted while the windshield 1 is held. However, in the practical use, the electronic scale 2 may be dropped when the door of the windshield 1 is slipped down, and the windshield 1 may be soiled by a fingerprint. Therefore, it is necessary that the electronic scale 2 be moved while the electronic scale main body is held.

FIGS. 9 and 10 specifically illustrate the states in which the windshield 1 is attached and detached.

Figure 9A:
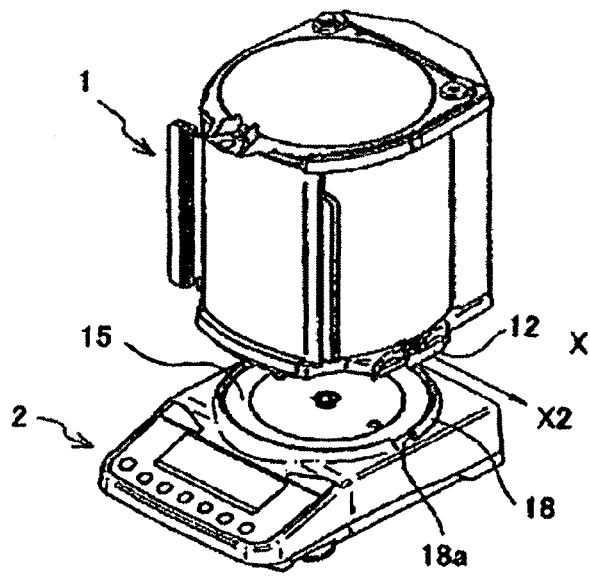
FIG. 9(A) is a perspective view illustrating the detachable windshield and electronic scale while the detachable windshield is detached.
Figure 9B:
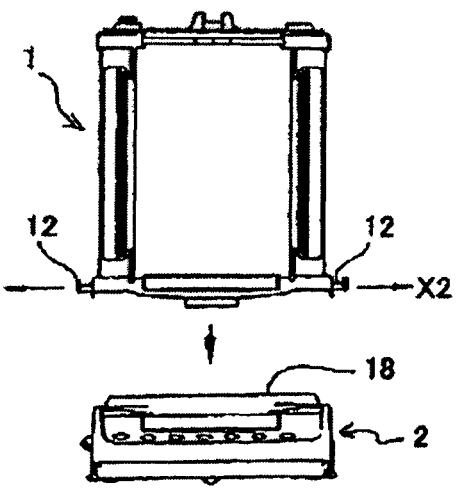
FIG. 9(B) is a front view illustrating the detachable windshield and electronic scale of FIG. 9(A).

In FIGS. 9(A) and 9(B), the knobs 12a of the moving members 12 of the windshield 1 are drawn in X1 and X2 directions such that the windshield 1 can be placed on the electronic scale 2, and then the windshield 1 is attached to the electronic scale 2. In this case, as described above, the windshield 1 is easily aligned in such a manner that the moving members 12 on the side of the windshield 1 are located in the notches 18a of the dam portion 18.

Figure 10A:
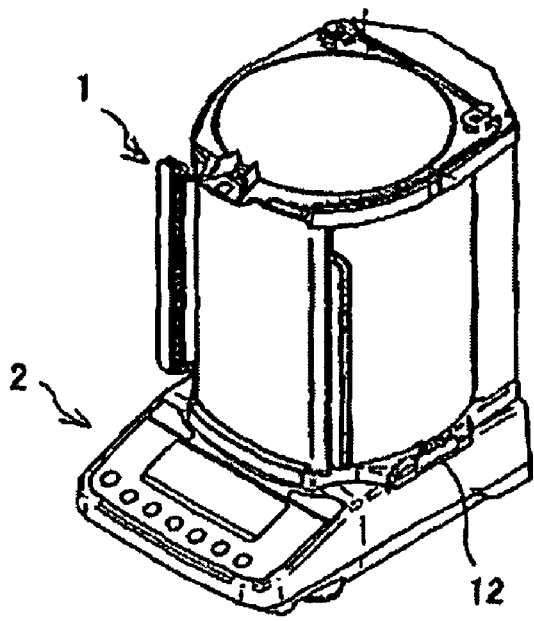
FIG. 10(A) is a perspective view illustrating the detachable windshield and electronic scale while the detachable windshield is attached.
Figure 10B:
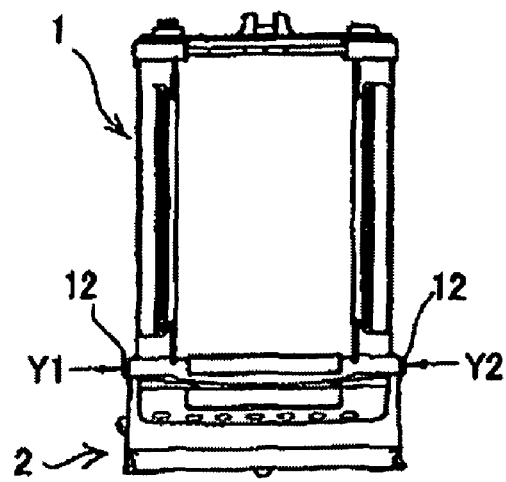
FIG. 10(B) is a front view illustrating the detachable windshield and electronic scale of FIG. 10(A).

When the windshield 1 is placed in the predetermined position of the electronic scale 2, the moving members 12 of the windshield 1 are pushed in Y1 and Y2 directions to engage the engagement members 11 of the moving members 12 with the pan floor member 15 of the electronic scale 2 as illustrated in FIGS. 10(A) and 10(B), thereby fixing strongly and integrally the windshield 1 to the electronic scale 2 like the integrated windshield.

With this configuration, when the moving members 12 are simultaneously drawn and pushed with both hands, the windshield can instantaneously be attached and detached by just a single touch of the moving member 12. Because the moving members 12 are formed on both sides in the bottom portion of the windshield 1 in relation to the front face of the windshield 1, the electronic scale user sitting on a chair in an attitude similar to that in measuring the sample can attach and detach the windshield 1 by manipulating the right and left moving members 12 with both hands of the user while facing the front face of the electronic scale 2. That is, in attaching and detaching the windshield, it is not necessary for the user to make special movement such as standing or manipulating at the back of the windshield while turning user's face to the backside of the windshield, and the user can appropriately perform the windshield attaching and detaching work as part of the measuring operation. Therefore, the windshield is detached when the measurement result does not need a small necessary minimum scale, and the windshield is attached when the measurement result needs the necessary minimum scale close to resolution of the electronic scale, so that the electronic scale user can easily attach and detach the windshield if needed without making the special movement for attaching and detaching the windshield in the measuring work. In this case, the user-friendliness of the invention is further improved when the whole of the windshield 1 is made of the synthetic resin to reduce the weight of the windshield 1. Because the windshield is attached at two points to extremely strengthen the engagement state between the windshield and the electronic scale in attaching the windshield, there is no risk of over-turning or displacement of the windshield even if the windshield is made of the synthetic resin having a small self weight. Accordingly, the capacity of the windshield and the configuration of the opening and closing portion can freely be determined.

The windshield 1 is attached and detached by drawing and pushing the moving members 12 disposed on both sides of the windshield in relation to the front face of the windshield, loci of the opening and closing of the slide doors 3A and 3B of the windshield 1 become a circle, and the slide doors 3A and 3B are not projected to the rear portion of the windshield 1 when the slide doors 3A and 3B are opened. Therefore, the electronic scale 2 to which the windshield 1 is attached can be brought close to a back wall surface even if the windshield 1 is attached and detached, and not only the user-friendliness of the windshield 1 but also a degree of freedom of the placement position of the electronic scale 2 can be enhanced when the electronic scale 2 is used in an environment, such as a laboratory and a production line, in which a large spatial restriction exists originally on the placement of the electronic scale.

In the configuration of the embodiment, the latch target on the side of the electronic scale 2 is set to the pan floor member 15 already existing in the electronic scale. Alternatively, the engagement and disengagement may be performed in such a manner that an engagement piece engaged with the latch member 11 is separately attached onto the side of the electronic scale 2 or a slit is formed in the dam portion 18 to draw and push the latch member 11 from and in the slit.

The windshield can be shared by the electronic scales such that the windshield can appropriately be attached and detached to and from the electronic scale according to the change of the environment of usage, in cases where plural electronic scales are placed in the production line to appropriately perform the measuring work, in addition to the case in which the electronic scale is individually used in a laboratory, school, and personal use.

The invention claimed is:

1. A detachable windshield for a weighing apparatus, which can appropriately be attached and detached depending on usage of a user, comprising
a windshield main body,
a plurality of attaching and detaching mechanisms provided in a bottom portion of the windshield main body to attach and detach the windshield to and from a weighing apparatus,
each of the attaching and detaching mechanisms comprising:
a latch member that is directly engaged with a member on the weighing apparatus, and that comprises a T-shape configuration, when viewed in plan view, defining an elongated body and a floor-member abutting portion extending from the elongated body for providing said direct engagement with the member on the weighing apparatus;

a moving member that causes the latch member to project and retract with respect to the inside of the windshield; and means for fixing the moving member at a predetermined position, and wherein the latch member and the member on the weighing apparatus are engaged and disengaged by the projection and retraction of the latch member along an axis passing through a longitudinal axis of the latch member, thereby attaching and detaching the windshield to and from the weighing apparatus.

2. The detachable windshield for a weighing apparatus according to claim 1, wherein the windshield main body comprises a lower frame member, a guide groove is formed in the lower frame member, and the moving member is slid along the guide groove.

3. The detachable windshield for a weighing apparatus according to claim 1, wherein the fixing means for fixing the moving member at a predetermined position comprises:

a latch pin provided on the moving member and that is biased so as to be projected beyond a lateral edge of the moving member; and a plurality of engagement recesses that are provided in the guide groove, the engagement recesses being formed at a plurality of locations in a direction of movement of the moving member, and the latch pin being engaged with a respective one of the recesses according to the movement of the moving member, thereby fixing the moving member at a predetermined position.

4. The detachable windshield for a weighing apparatus according to claim 1, wherein the moving member and the latch member are fastened together, and at least the latch member of these two members is made of a metal.

5. The detachable windshield for a weighing apparatus according to claim 1, wherein the member on the weighing apparatus is a pan floor member disposed below a pan.

6. The detachable windshield for a weighing apparatus according to claim 5, wherein the floor-member abutting portion of the latch member is engaged with a backside of the pan floor member in fixing the windshield to the weighing apparatus.

7. The detachable windshield for a weighing apparatus according to claim 1, wherein the plurality of attaching and detaching mechanisms are two and provided at positions facing each other and intersecting a plane approximately parallel to a front face of the windshield and approximately bisecting the windshield.

* * * * *